D. D. STEPHENS.
ELEVATING MECHANISM FOR CORN PLANTERS.
APPLICATION FILED NOV. 20, 1911.
1,131,014.
Patented Mar. 9, 1915.
2 SHEETS—SHEET 2.
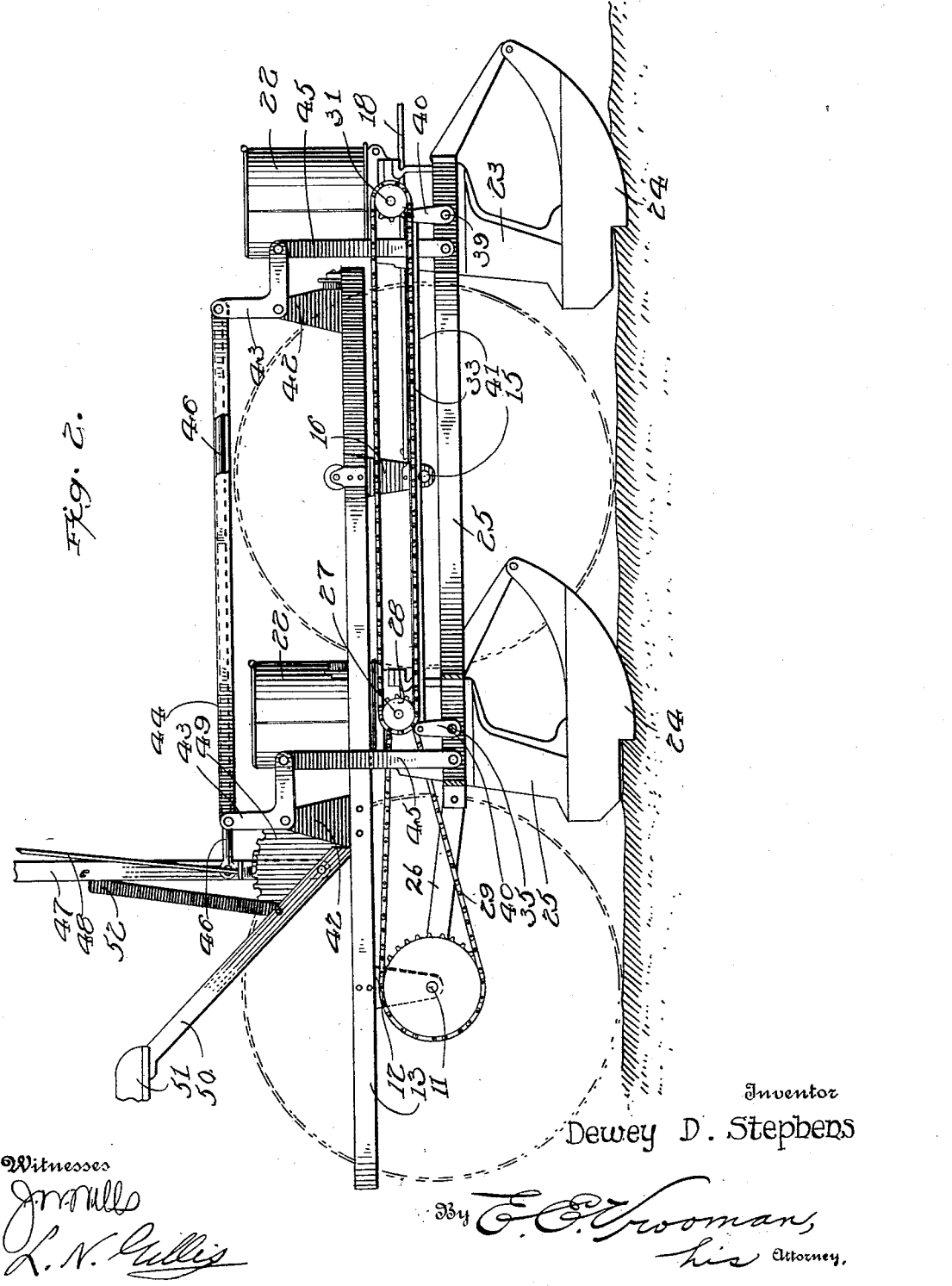
Inventor
Dewey D. Stephens

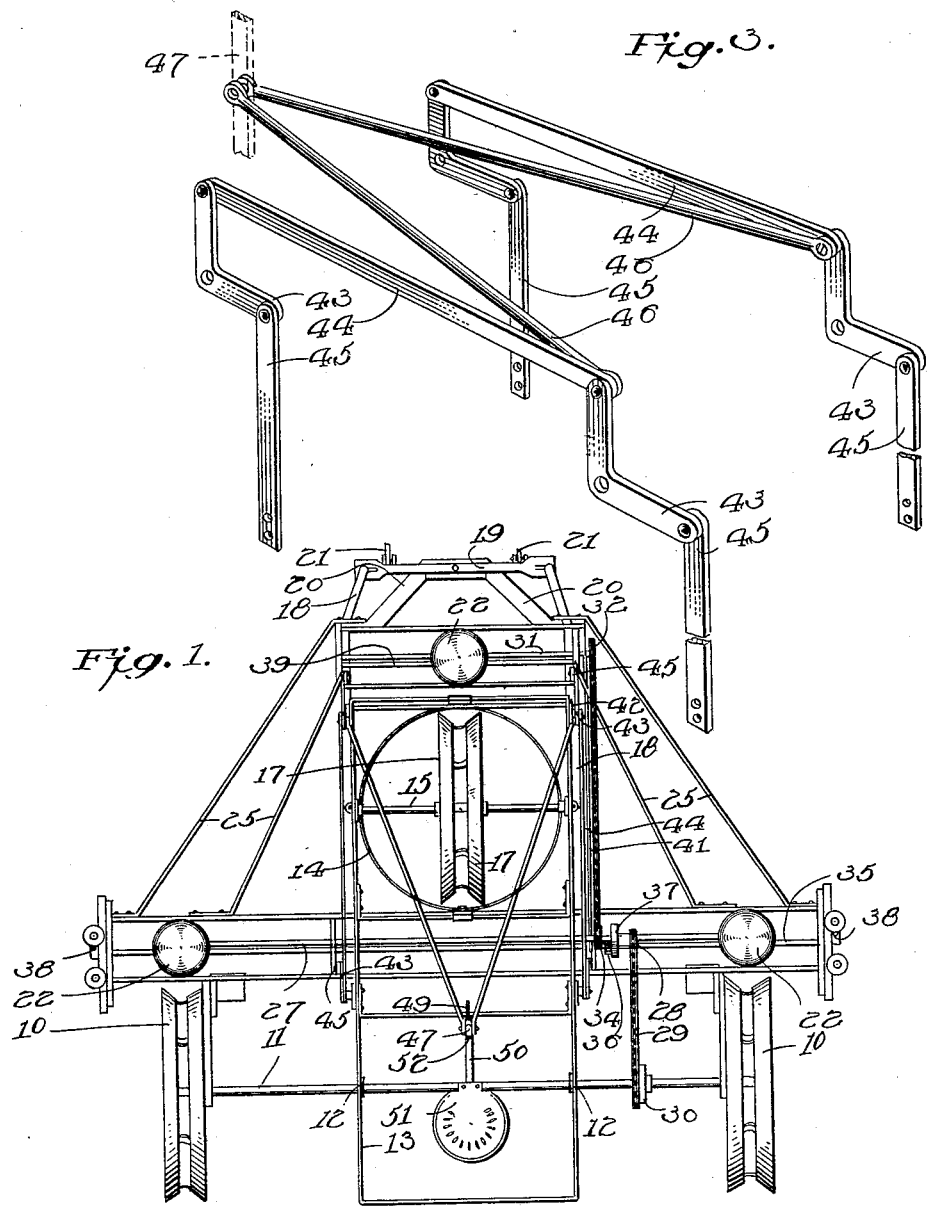

UNITED STATES PATENT OFFICE.

DEWEY D. STEPHENS, OF AINSWORTH, IOWA.

ELEVATING MECHANISM FOR CORN-PLANTERS.

1,131,014.
Specification of Letters Patent.
Patented Mar. 9, 1915.

Application filed November 20, 1911. Serial No. 661,271.

*To all whom it may concern:*

Be it known that I, DEWEY D. STEPHENS, a citizen of the United States, residing at Ainsworth, in the county of Washington and State of Iowa, have invented certain new and useful Improvements in Elevating Mechanism for Corn-Planters, of which the following is a specification, reference being had therein to the accompanying drawing.

This invention relates to corn planters of the type set forth in my co-pending application filed on August 15th, 1911, and bearing the Serial No. 644,118. In the said application there is shown and described a planter having three triangularly arranged wheels and three seeder devices each arranged closely adjacent one of the wheels. I do not, therefore, herein broadly claim a planter having three wheels and three seeder devices arranged as disclosed in the said application.

In my co-pending application, 661,270, for check-row mechanism for planters, filed November 20, 1911, I have shown and claimed mechanism for simultaneously actuating and controlling three triangularly arranged seeder devices in a manner to cause hill planting. I do not, therefore, herein claim the seeder actuating mechanism as part of my present invention.

The principal object of the invention is to provide means for raising the planter shoes simultaneously from the ground so that the shoe in the front seeding mechanism will be raised together with the shoes in the rear mechanisms.

With the above and other objects in view the invention consists in general of certain novel details of construction, and combinations and arrangements of parts as will be hereinafter fully described, illustrated in the accompanying drawings, and specifically set forth in the claims.

In the accompanying drawings like characters of reference indicate like parts in the several views, and: Figure 1 is a plan view of a planter constructed in accordance with this invention. Fig. 2 is a side elevation of such a planter. Fig. 3 is a detail perspective view of the lifting mechanism.

The planter herein described comprises a pair of ground wheels 10 carried on an axle 11 which is supported in suitable bearings or hangers 12 carried by a main frame 13. This main frame has a forwardly extending portion wherein there is supported a fifth wheel 14 carrying an axle 15 in hangers 16 and on this axle is a steering wheel 17. Extending forward from the fifth wheel 14 are links 18 which are connected to a cross bar 19 pivoted intermediate its ends to a support 20 and to this cross bar is attached the yoke 21 which is adapted to receive a pole not shown so that as the pole is turned the fifth wheel will likewise be turned with the result that the steering wheel 17 will be set at an angle. All of these wheels, both the forward steering and the rear supporting, are constructed with beveled faces to constitute covering wheels. From the foregoing it will be seen that the supporting wheels are in the form of an isosceles triangle with the rear wheels acting as the base and the steering wheel as the apex.

In front of each of the wheels is a seed hopper 22 below which is a boot 23 carrying a shoe 24 for the purpose of opening the furrow for the deposition of the seed. The boots support the seed hoppers and are in turn connected to a frame 25 which is connected at its rear portion by links 26 with the axle 11 so that the frame 25 may be raised or lowered with respect to the frame 13.

Extending through the machine from side to side is a shaft 27 whereon is mounted a sprocket 28 which is connected by means of a chain 29 with a driving sprocket 30 on the shaft or axle 11. At the forward end of the machine there is provided a shaft 31 whereon is a sprocket 32 connected by a chain 33 with a sprocket 34 on the shaft 27. It will thus be seen that as the shaft 27 rotates the shaft 31 will also rotate since the two sprockets 32 and 34 are keyed on the respective shafts. The sprocket 28, however, normally revolves freely on the shaft 27 so that unless clutched to shaft the same will not revolve. These shafts 27 and 31 are geared to the seed plates of the seed hoppers in the usual manner, this connection not deemed necessary here to be shown as the same is common to the art and forms no part of the present invention. Below the shaft 27 is a rock shaft 35 whereon is a rock arm 36 which actuates a clutch mechanism indicated in general at 37, so that the gear 28 may be clutched in the usual manner to the shaft 27 whenever the rock shaft is operated.

For the purpose of operating the rock shaft the usual check row arms 38 are provided at each end of this shaft in the manner common to check row planters. The shaft 31 has beneath it a shaft 39, and the shafts 35 and 39 are provided with rock arms 40 which are connected by means of a link 41 so that when one of the shafts is actuated others will likewise be actuated.

Upon the frame 13 there is provided a plurality of supports 42 whereto are journaled bell crank levers 43 and these bell crank levers are connected at their upper ends by links 44 running longitudinally of the planter while their horizontal arms are provided with links 45, each of their lower ends being connected to the frame 25. The forward levers 43 have connected thereto links 46 which converge rearwardly and have their rear ends connected to a lever 47 provided with the usual latch arrangement 48 working over a quadrant 49. Extending rearwardly from the main frame is a seat frame 50 which carries the quadrant and is provided with a seat 51 for the driver. Connecting this lever 47 with the seat frame 50 is a spring 52. Now, it will be plain that by moving the lever 47 rearwardly the bell crank levers 43 will be tilted so that the links 45 will be lifted and carry with them the lower frame 25, thus raising the shoes clear of the ground.

In the operation of the planter as the same is driven over the ground a check wire passing through the fork 38 operates the clutch 37 every time that one of the tappets on the check wire engages the fork and through the seeder mechanism trips the seed at predetermined intervals it being noted that the forward seed delivery mechanism is simultaneously actuated with that at the rear through the medium of the sprocket chain 33. There has thus been provided a simple and efficient device of the kind described and for the purpose specified.

It is obvious that many minor changes may be made in the form and construction of the invention without departing from the material principles thereof. It is, therefore, not wished to confine the invention to the exact form herein shown and described but it is wished to include all such as properly come within the scope of the appended claims.

Having thus described my invention what is claimed as new, is:—

1. In a three-row corn planter, lateral seeding devices, each including a shoe, and an intermediate seeding device in advance of the lateral devices, and including a shoe, and means to simultaneously lift all of said shoes substantially equal distances from the ground.

2. In a three-row corn planter, lateral seeding devices, each including a shoe, an intermediate seeding device spaced in advance of the lateral devices a distance equal to one hill, said last-mentioned device including a shoe, and means for simultaneously raising all of said shoes substantially equal distances from the ground.

3. In a three-row corn planter, the combination of a main frame, three ground wheels upon which the frame is solely supported, two of the wheels being positioned at transversely opposite points and the third wheel being positioned between the two said wheels and a substantial distance in advance of them, a secondary frame mounted for parallel vertical movement relative to itself and to the main frame, means within the control of an operator on the planter for moving the secondary frame with respect to the main frame, and three seed separating and depositing devices mounted on the secondary frame, each device comprising a furrow opening runner directly in advance of a ground wheel, the ground wheels thus serving as covering devices.

4. In a three-row corn planter, a main frame, a secondary frame, seeding devices carried by the rear portion of the secondary frame, an intermediate seeding device carried by the front portion of said frame in advance of the rear devices, bell cranks journaled on the main frame, links connecting an arm of each bell crank with the secondary frame, and means to simultaneously rock all of said bell cranks.

5. In a three-row corn planter, a main frame, a secondary frame, seeding devices carried by the rear portion of the secondary frame, an intermediate seeding device carried by the front portion of said frame in advance of the rear devices, bell cranks journaled on the main frame, links connecting an arm of each bell crank with the secondary frame, and means to simultaneously rock all of said bell cranks, said means comprising links extending longitudinally of the planter and connecting said bell cranks in pairs, a latch lever and quadrant carried on the main frame, and links extending forwardly from the latch lever and connected to the links connecting the bell-cranks in pairs.

In testimony whereof I hereunto affix my signature in presence of two witnesses.

DEWEY D. STEPHENS.

Witnesses:
LENAARD A. SAYRE,
WILLIAM ED GREEN.